(12) United States Patent
Okuda et al.

(10) Patent No.: US 9,466,820 B2
(45) Date of Patent: Oct. 11, 2016

(54) SEPARATOR INCORPORATING ELECTRODE, ELECTRICAL STORAGE DEVICE, AND VEHICLE

(71) Applicant: KABUSHIKI KAISHA TOYOTA JIDOSHOKKI, Kariya-shi, Aichi-ken (JP)

(72) Inventors: Motoaki Okuda, Kariya (JP); Takayuki Kato, Kariya (JP)

(73) Assignee: KABUSHIKI KAISHA TOYOTA JIDOSHOKKI, Achi-ken (JP)

( * ) Notice: Subject to any disclaimer, the term of this patent is extended or adjusted under 35 U.S.C. 154(b) by 284 days.

(21) Appl. No.: 14/375,483

(22) PCT Filed: Jan. 31, 2013

(86) PCT No.: PCT/JP2013/052253
§ 371 (c)(1),
(2) Date: Jul. 30, 2014

(87) PCT Pub. No.: WO2013/115332
PCT Pub. Date: Aug. 8, 2013

(65) Prior Publication Data
US 2015/0017509 A1   Jan. 15, 2015

(30) Foreign Application Priority Data
Feb. 3, 2012   (JP) .................................. 2012-022196

(51) Int. Cl.
| | |
|---|---|
| H01M 2/14 | (2006.01) |
| H01M 2/16 | (2006.01) |
| H01G 11/52 | (2013.01) |
| H01M 2/18 | (2006.01) |
| H01G 11/12 | (2013.01) |
| H01G 11/22 | (2013.01) |
| H01M 2/26 | (2006.01) |
| H01M 10/02 | (2006.01) |

(52) U.S. Cl.
CPC ........... *H01M 2/1673* (2013.01); *H01G 11/12* (2013.01); *H01G 11/22* (2013.01); *H01G 11/52* (2013.01); *H01M 2/1686* (2013.01); *H01M 2/18* (2013.01); *H01M 2/26* (2013.01); *H01M 10/02* (2013.01); *H01M 2220/20* (2013.01); *Y02E 60/13* (2013.01); *Y02T 10/7022* (2013.01)

(58) Field of Classification Search
CPC ...................................................... H01M 2/14
See application file for complete search history.

(56) References Cited

FOREIGN PATENT DOCUMENTS

| | | |
|---|---|---|
| JP | 2002-8618 A | 1/2002 |
| JP | 2003-92100 A | 3/2003 |

(Continued)

OTHER PUBLICATIONS

International Preliminary Report on Patentability dated Aug. 5, 2014, issued by the International Bureau on behalf of the International Searching Authority in counterpart International Application No. PCT/JP2013/052253.

*Primary Examiner* — Jacob Marks
(74) *Attorney, Agent, or Firm* — Sughrue Mion, PLLC

(57) ABSTRACT

Provided is a separator incorporating an electrode, provided with two of separator sheets facing each other, an electrode sandwiched between the separator plates. Each of the facing surfaces of the separator sheets is provided with a coated portion coated with a ceramic, and a non-coated portion that is not coated with the ceramic, located in at least a portion of ranges corresponding to peripheral edges of the electrode. The separator sheets are joined to one another in the non-coated portion.

8 Claims, 7 Drawing Sheets

(56) References Cited

FOREIGN PATENT DOCUMENTS

| JP | 2009-277397 | * | 11/2009 |
| JP | 2009-277397 | A | 11/2009 |
| JP | 2011-159434 | A | 8/2011 |
| JP | 2011-175749 | A | 9/2011 |

* cited by examiner

SEPARATOR INCORPORATING ELECTRODE, ELECTRICAL STORAGE DEVICE, AND VEHICLE

CROSS REFERENCE TO RELATED APPLICATIONS

This application is a National Stage of International Application No. PCT/JP2013/052253 filed Jan. 31, 2013, claiming priority based on Japanese Patent Application No. 2012-022196 filed Feb. 3, 2012, the contents of all of which are incorporated herein by reference in their entirety.

BACKGROUND OF THE INVENTION

The present invention relates to an electrode-incorporating separator, which is incorporated inside the separator, an electrical storage device, and a vehicle.

As is conventionally known, a rechargeable secondary battery is reusable and generally employed in various apparatuses and devices. In the field of vehicles, reduction of use of fossil fuel and decrease of carbon dioxide emission are demanded. As a result, vehicles driven by motors using such secondary batteries as power sources, including hybrid vehicles and electric vehicles, are now widely used. The secondary batteries are demanded to be rechargeable/dischargeable by high-current and have a high capacity. For example, lithium ion secondary batteries are mass-produced as finished products.

As this type of secondary batteries, secondary batteries having a laminated structure, for example, are publicly known. One such secondary battery includes an electrode assembly formed by alternately laminating a positive electrode sheet, a negative electrode sheet, and a separator for insulating the sheets from each other. However, since the laminated structure is manufactured through steps of sequentially laminating the positive electrode sheet, the negative electrode sheet, and the separator, a large number of laminating steps are necessary. This prolongs the takt time for manufacturing the secondary battery and decreases productivity. To solve this problem, a technique has been proposed in which the number of the laminating steps is decreased to improve the productivity of batteries by, for example, incorporating a positive electrode sheet in a bag-like separator in advance (see Patent Document 1).

It is desired that such types of separators have improved durability against, for example, heat shrinkage. To obtain the improved durability, it has been proposed to coat a surface of a separator using a certain coating material (for example, a ceramic). However, if the bag-like separator is formed by joining a separator body having a surface coated with coating material such that the separator body has a bag-like shape, the coating material applied onto the surface of the separator body may hamper desirable joining of the separator body, thus making it difficult to form the bag-like separator in an appropriate manner.

PRIOR ART DOCUMENTS

Patent Document

Patent Document 1: Japanese Laid-Open Patent Publication No. 2003-92100

SUMMARY OF THE INVENTION

Accordingly, it is an objective of the present invention to provide an electrode-incorporating separator, which includes two separator sheets coated with a ceramic and firmly joined to each other with the electrode arranged between the separator sheets, an electrical storage device, and a vehicle.

Means for Solving the Problems

To achieve the foregoing object and in accordance with one aspect of the present invention, an electrode-incorporating separator is provided that has two separator sheets facing each other and an electrode held between the two separator sheets. Facing surfaces of the two separator sheets each include a coated portion coated with a ceramic and a non-coated portion that is not coated with the ceramic and is arranged in at least a portion of a range corresponding to a periphery of the electrode. The two separator sheets are joined to each other at the non-coated portions.

In this configuration, each separator sheet has the coated portion and the non-coated portion. As a result, the portions of the two separator sheets, between which the electrode is held, are coated with the ceramic and the separator sheets are joined to each other at the non-coated portions. The electrode-incorporating separator, which includes the separator sheets and incorporates the electrode between the separator sheets, thus has improved durability against heat shrinkage. Also, the two separator sheets are firmly joined to each other with the electrode held between the separator sheets.

In at least one of the two separator sheets, at least a portion of a surface opposite to the surface facing the electrode is preferably coated with the ceramic. This configuration improves durability of the electrode-incorporating separator against heat shrinkage.

In accordance with another aspect of the present invention, an electrode-incorporating separator is provided that has two separator sheets facing each other and an electrode held between the separator sheets. The entire facing surface of each of the two separator sheets configures a non-coated portion, which is not coated with the ceramic. In at least one of the two separator sheets, at least a portion of a surface opposite to the surface facing the electrode is coated with the ceramic. The two separator sheets are joined to each other at the non-coated portions. This configuration improves durability of the electrode-incorporating separator against heat shrinkage and firmly joins the two separator sheets with the electrode held between the separator sheets.

It is preferable that each of the separator sheets have a rectangular shape, and each non-coated portion be formed along at least a part of each of sides of the separator sheets that face each other. This configuration joins the two separator sheets, which are coated with the ceramic, with each other with minimally necessary positions.

Each non-coated portion is preferably formed along a side of the associated separator sheet along the entire length of the side. This configuration increases the surface areas by which the two separator sheets are joined to each other, thus joining the separator sheets with increased firmness.

The electrode preferably includes a tab that protrudes outward from a periphery of the electrode and extends on a plane coinciding with a surface of the electrode, and the tab is preferably held between the non-coated portions of the two separator sheets. In this configuration, the two separator sheets are joined to each other at opposite sides of the tab of the electrode in the extending direction of each non-coated portion. This prevents the electrode from being displaced in the electrode-incorporating separator.

The electrode is preferably a positive electrode. In this configuration, the outer dimensions of the electrode-incorporating separator are equal to the outer dimensions of a negative electrode, for example. This facilitates positioning of the electrode-incorporating separator and the negative electrode with respect to each other at the time when the separator and the negative electrode are alternately laminated with each other to assemble an electrode assembly.

In accordance with another aspect of the present invention, an electrical storage device is provided that includes the above described electrode-incorporating separator.

In accordance with another aspect of the present invention, the electrical storage device is a secondary battery.

In accordance with yet another aspect of the present invention, a vehicle is provided on which the above described the secondary battery is mounted.

According to the present invention, the two separator sheets coated with the ceramic are firmly joined to each other with an electrode incorporated between the separator sheets.

DETAILED DESCRIPTION OF THE PREFERRED EMBODIMENTS

An electrode-incorporating separator, an electrical storage device, and a vehicle according to an embodiment of the present invention will now be described with reference to FIGS. 1 to 10.

Figure 1:
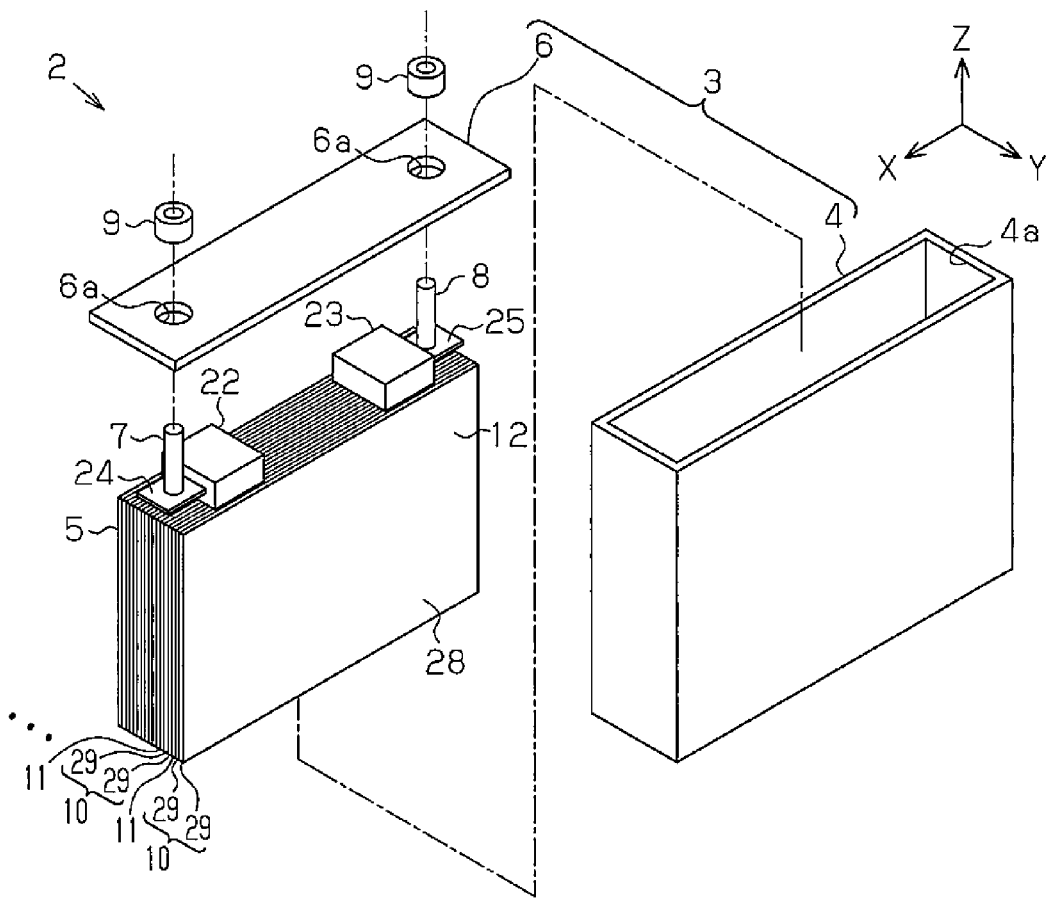
FIG. 1 is an exploded perspective view showing the configuration of a secondary battery according to an embodiment of the present invention.
Figure 2:
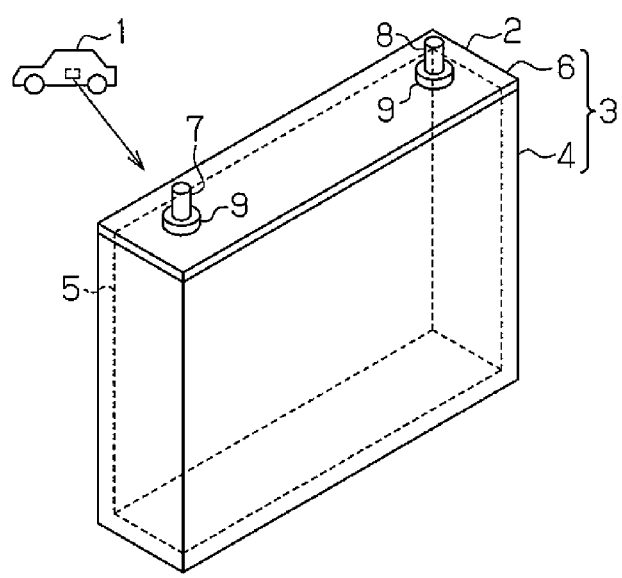
FIG. 2 is a perspective view showing the appearance of the secondary battery.

As shown in FIGS. 1 and 2, a vehicle 1, such as a hybrid vehicle (a plug-in hybrid vehicle) or an electric vehicle, includes a secondary battery 2 serving as the power source of a motor (not shown), which is employed as the drive source of the vehicle 1. The secondary battery 2 has an electrode assembly 5, which is a power generating element, and a metal case 3 incorporating the electrode assembly 5. The case 3 includes a case body 4 having an upper opening 4a and a metal plate-like case lid 6, which hermetically seals the opening 4a of the case body 4. The electrode assembly 5 is incorporated in the case body 4.

With reference to FIG. 2, a positive terminal 7 serving as a positive electrode terminal and a negative terminal 8 serving as a negative electrode terminal are mounted on the top surface of the secondary battery 2. The case lid 6 has two openings 6a, through which the positive terminal 7 and the negative terminal 8 are exposed to the exterior of the case 3. Two annular insulation members 9 are arranged between the positive terminal 7 and the case 3 and between the negative terminal 8 and the case 3 and insulate the corresponding positive and negative terminals 7, 8 from the case 3.

Figure 3:
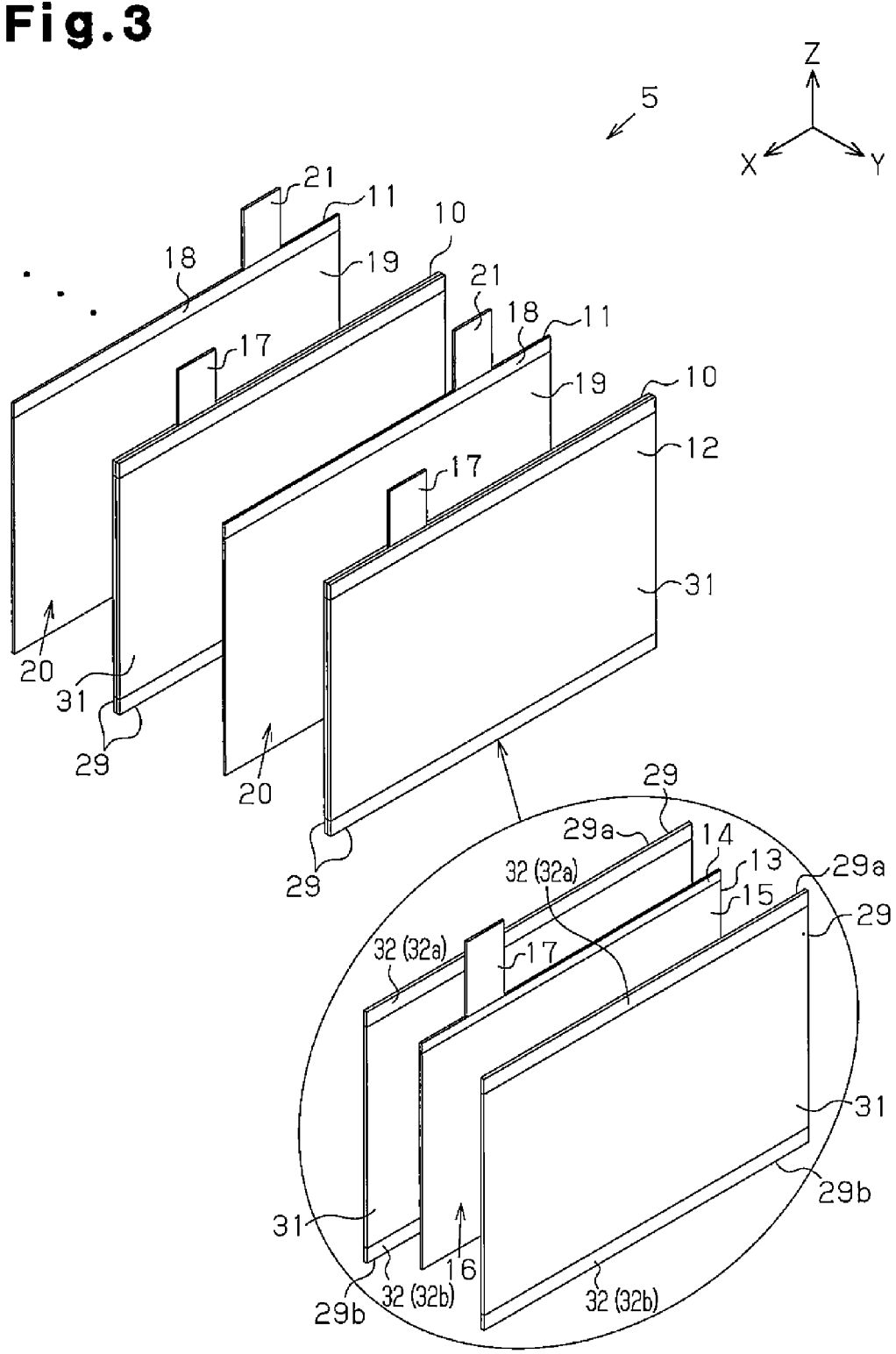
FIG. 3 is an exploded perspective view showing the configuration of an electrode assembly.

As shown in FIG. 3, the electrode assembly 5 has multiple layers. Each layer of the electrode assembly 5 includes an electrode-incorporating separator 10 and a thin negative electrode sheet 11 configuring a negative electrode. The electrode-incorporating separator 10 includes a bag-like separator body 12 and a thin positive electrode sheet 13, which is incorporated in the separator body 12 and configures a positive electrode. The electrode assembly 5 has a laminated structure in which the electrode-incorporating separators 10 and the negative electrode sheets 11 are laminated in the thickness direction of the electrode assembly 5 (the laminating direction, which is the Y-axis direction in FIG. 1). The negative electrode sheets 11 and the positive electrode sheets 13 configure electrodes.

Each positive electrode sheet 13 has a metal sheet-like foil 14. A positive electrode active material layer 15 is applied onto both surfaces of the foil 14 to configure a coated portion 16. A part of the foil 14 protrudes from a periphery of the positive electrode sheet 13 as a tab extending in a plane coinciding with the surface of the positive electrode sheet 13. The protruded portion configures a non-coated portion 17, which does not include the positive electrode active material layer 15. In other words, in the present embodiment, the tab corresponds to the non-coated portion 17. Each negative electrode sheet 11 includes a metal sheet-like foil 18. A negative electrode active material layer 19 is applied onto both surfaces of the foil 18. Like the positive electrode sheet 13, the negative electrode sheet 11 includes a coated portion 20 and a non-coated portion 21.

Figure 4:
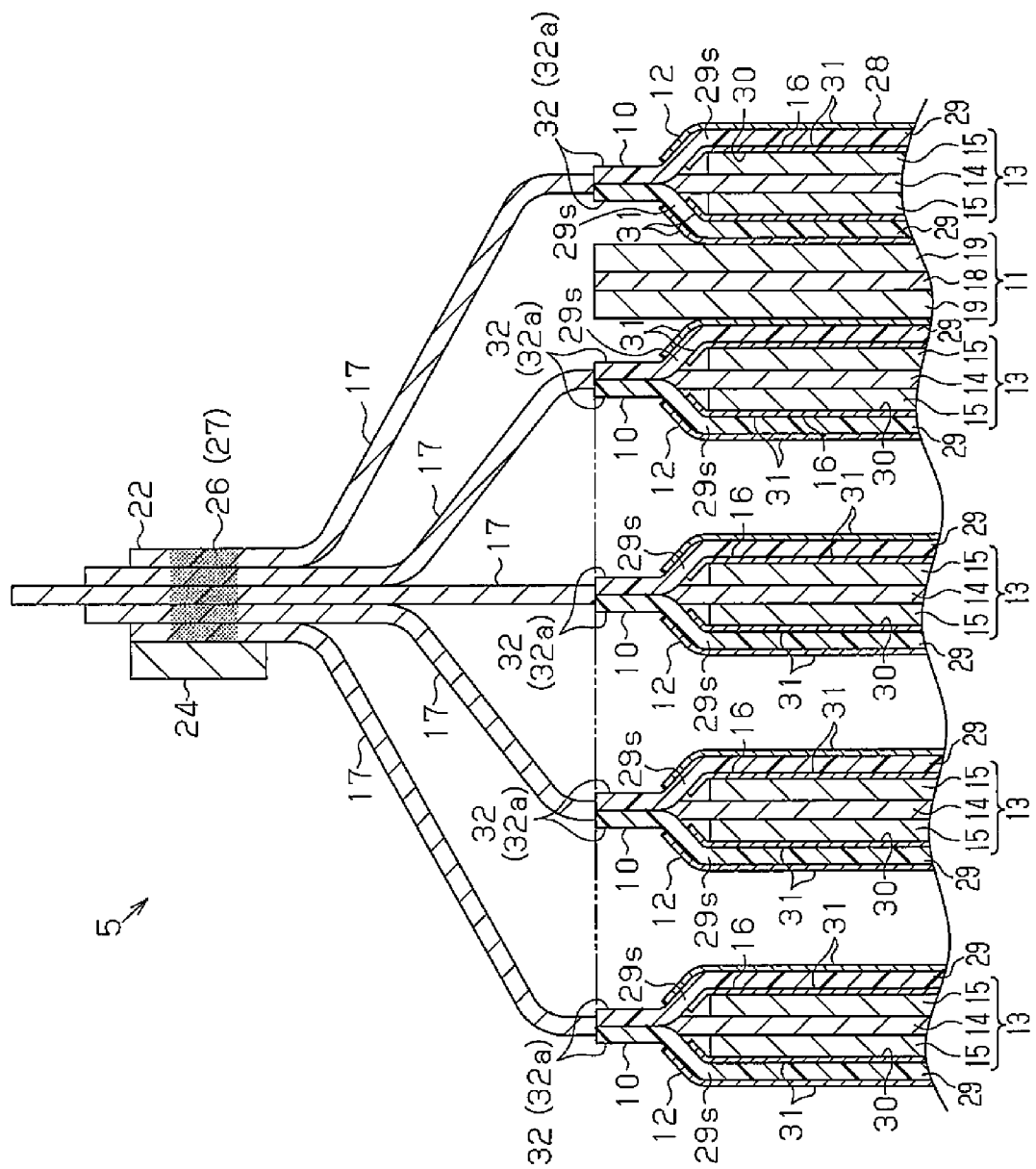
FIG. 4 is a cross-sectional view showing a portion of a collector portion to which a lead is welded.

As illustrated in FIGS. 1 and 4, the non-coated portions 17 of the positive electrode sheets 13 are bundled with one another in the laminating direction Y at a collector portion 22. The non-coated portions 21 of the negative electrode sheets 11 are bundled with one another in the laminating direction Y at a collector portion 23. A lead 24 and a lead 25 are welded to the collector portion 22 and the collector portion 23, respectively. The lead 24 is fixed to the collector portion 22 at a weld portion 26, which is arranged in the vicinity of the base of the collector portion 22. The lead 25 is fixed to the collector portion 23 at a weld portion 27, which is located in the vicinity of the base of the collector portion 23. The positive terminal 7 is connected to the positive electrode lead 24 and the negative terminal 8 is connected to the negative electrode lead 25. The collector portions 22, 23 protrude upward from the top surface of an electrode pair 28, which is the body of the electrode assembly 5. The collector portions 22, 23 are arranged in the vicinities of the corresponding ends of the electrode pair 28 in the widthwise direction (the X-axis direction in FIG. 1) and spaced from each other.

Figure 5:
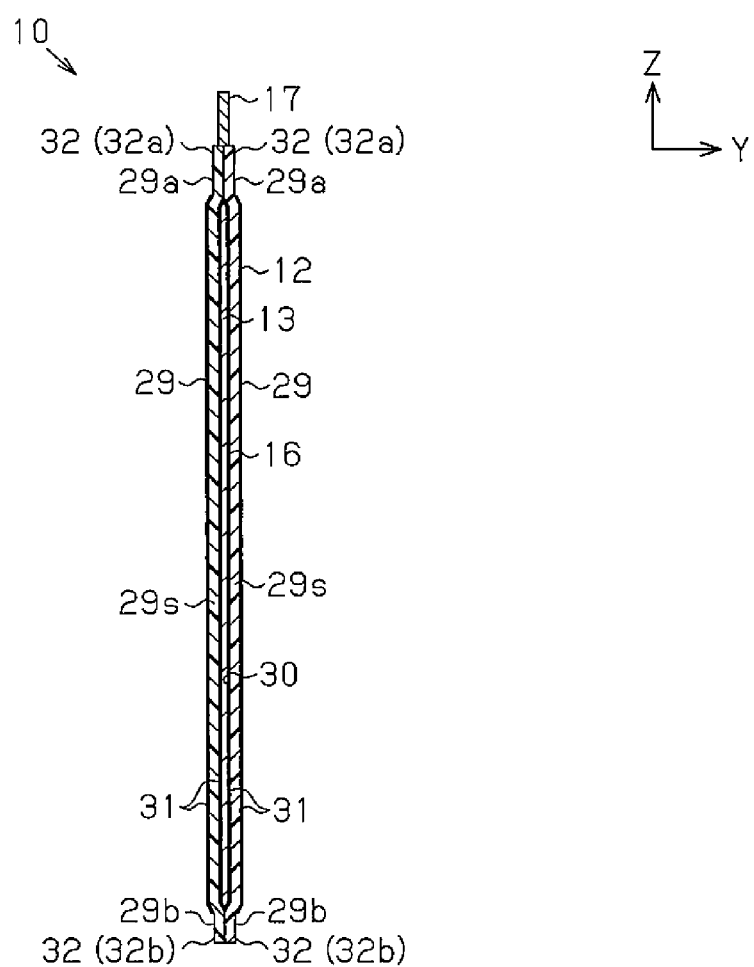
FIG. 5 is a cross-sectional view showing an electrode-incorporating separator.

With reference to FIGS. 3 and 5, each electrode-incorporating separator 10 has two rectangular separator sheets 29, which are overlapped with each other and opposed to each other. The two separator sheets 29 are welded to each other at upper sides 29a and lower sides 29b of the separator sheets 29 and thus formed in a bag-like shape. This forms an incorporating portion 30 in the electrode-incorporating separator 10 to incorporate the corresponding positive electrode sheet 13 in the incorporating portion 30. The separator sheets 29 are sheet members for insulating the positive electrode sheets 13 from the corresponding negative electrode sheets 11.

Figure 6:
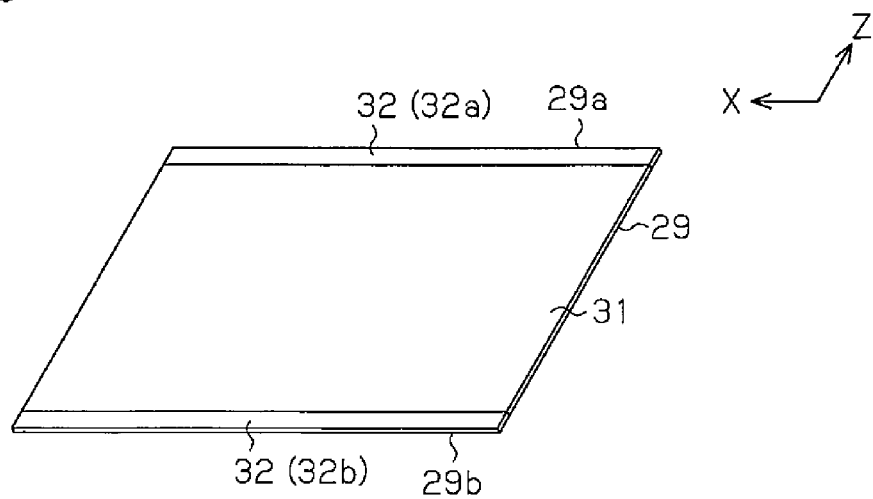
FIG. 6 is a perspective view showing a separator sheet.

As shown in FIG. 6, ceramic is applied onto a substantially whole range of each of a front surface and a back surface of a sheet base material 29s of each separator sheet 29 except for the ranges corresponding to the upper side 29a and the lower side 29b, which are two facing sides. The portion coated with the ceramic configures a ceramic-coated portion 31. In this manner, each electrode-incorporating separator 10 of the present embodiment includes opposite surfaces coated with a ceramic and thus, has improved durability against heat shrinkage.

The upper side 29a and the lower side 29b of each separator sheet 29 correspond to peripheral portions of an electrode and configure non-coated portions 32, which are not coated with the ceramic. In the present embodiment, the non-coated portion 32 formed on the upper side 29a is referred to as an upper non-coated portion 32a. The non-coated portion 32 formed on the lower side 29b is referred to as a lower non-coated portion 32b. The upper non-coated portion 32a and the lower non-coated portion 32b extend along the entire dimension of the electrode-incorporating separator 10 in the widthwise direction (the X-axis direction or the widthwise direction of each separator sheet 29). Although the separator sheets 29 are coated with the ceramic, the separator sheets 29 can be welded together at the non-coated portions 32a, 32b.

Figure 7:
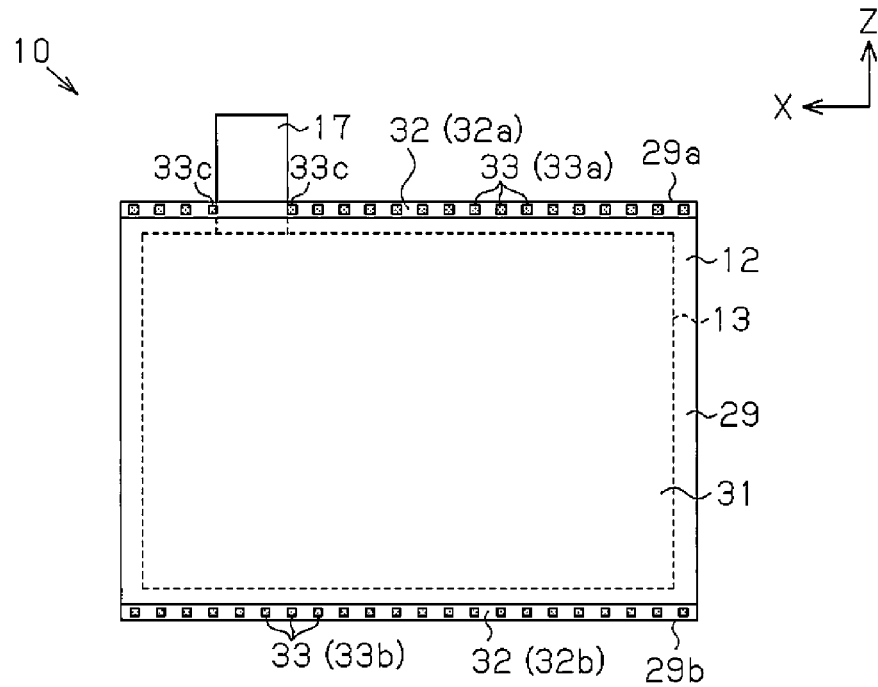
FIG. 7 is a plan view showing the electrode-incorporating separator.

As illustrated in FIG. 7, the separator sheets 29 of each pair are welded together along the entire lengths of the separator sheets 29 in the longitudinal direction (the X-axis direction) at each of the non-coated portions 32a, 32b. The weld portions are attached and fixed to each other as weld portions 33. The two separator sheets 29 may be welded together either intermittently or continuously. In the present embodiment, the weld portions 33 formed in the upper non-coated portion 32a are referred to as upper weld portions 33a, and the weld portions 33 formed in the lower non-coated portion 32b are referred to as lower weld portions 33b. The weld portions 33 (33a, 33b) configure joint portions.

Each positive electrode sheet 13 is held by the upper weld portions 33a and the lower weld portions 33b from above and below and thus positioned in the incorporating portion 30 in the up-down direction (the Z-axis direction, a direction perpendicular to the X-axis on the plane in which the separator sheet 29 is located). Two positioning weld portions 33c, which are included in the upper weld portions 33a, are arranged in the vicinity of the base of the non-coated portion 17 of each positive electrode sheet 13. This positions the positive electrode sheet 13 in the incorporating portion 30 in the left-right direction (direction Z in FIG. 7). The positioning weld portions 33c configure joint portions.

Steps of manufacturing the electrode-incorporating separator 10 of the present embodiment will now be described with reference to FIGS. 8 to 10.

Figure 8:
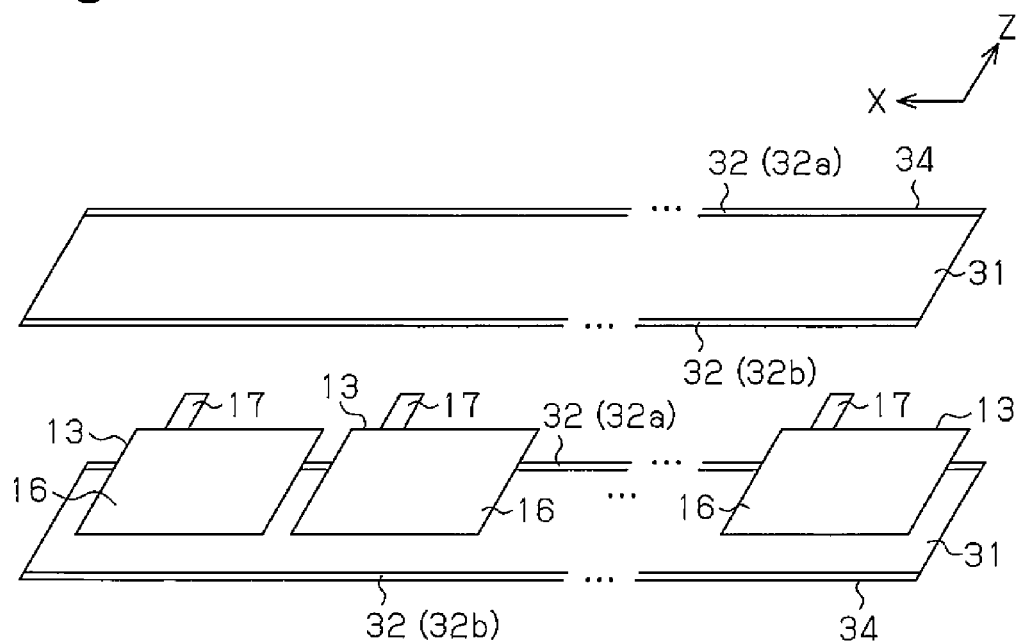
FIG. 8 is an explanatory diagram illustrating a state in which positive electrode sheets are arranged on a separator sheet base material.

As illustrated in FIG. 8, in a separator manufacturing step, two elongated belt-like separator sheet base materials 34 each having ceramic-coated surfaces are prepared. The upper non-coated portion 32a and the lower non-coated portion 32b, which are not coated with the ceramic, are formed on the upper side and the lower side, respectively, of each separator sheet base material 34. Positive electrode sheets 13 are aligned and arranged between the two separator sheet base materials 34.

Figure 9:
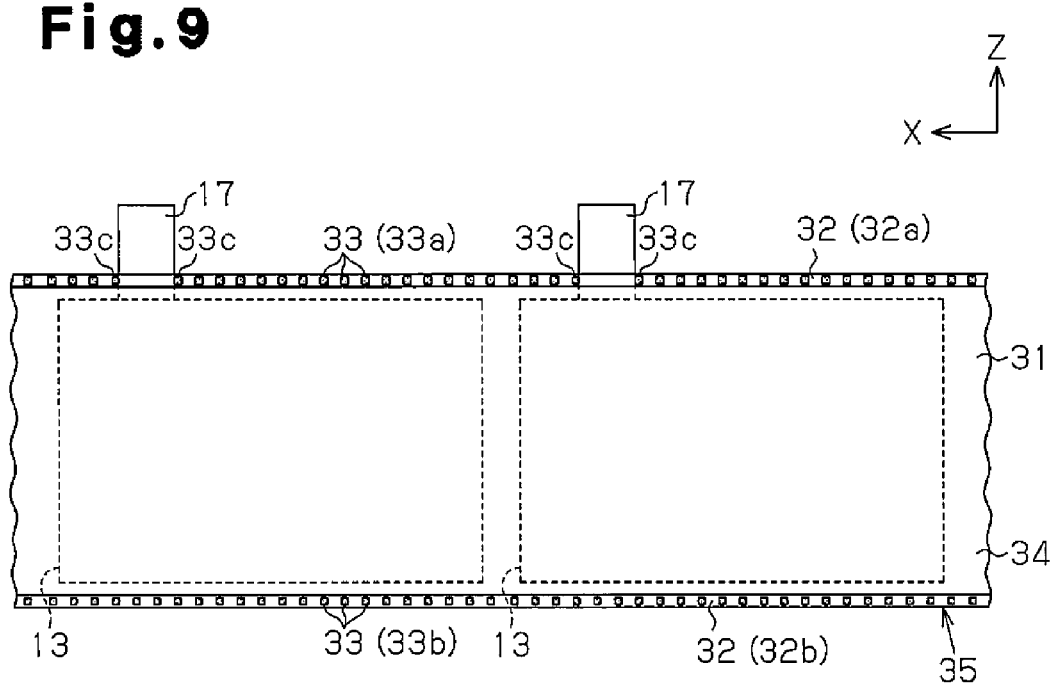
FIG. 9 is an explanatory diagram illustrating a state in which separator sheet base materials are welded to each other with positive electrode sheets arranged between the separator sheet base materials.

Then, with reference to FIG. 9, the two overlapped separator sheet base materials 34 are welded to each other at the upper non-coated portions 32a and the lower non-coated portions 32b. Each positive electrode sheet 13 is thus wrapped and integrated with the two separator sheet base materials 34 (as a unit). In other words, the two belt-like separator sheet base materials 34 and the multiple positive electrode sheets 13 are assembled as a single belt-like separator unit 35. In this manner, the separator sheet base material 34 have bag-like shapes and the positive electrode sheets 13 are incorporated between the two separator sheet base materials 34. In welding, the positioning weld portions 33c are arranged at opposite left and right sides of the non-coated portion 17 of each positive electrode sheet 13 such that the positive electrode sheet 13 is positioned in the left-right direction (the X-axis direction in FIG. 9).

Figure 10:
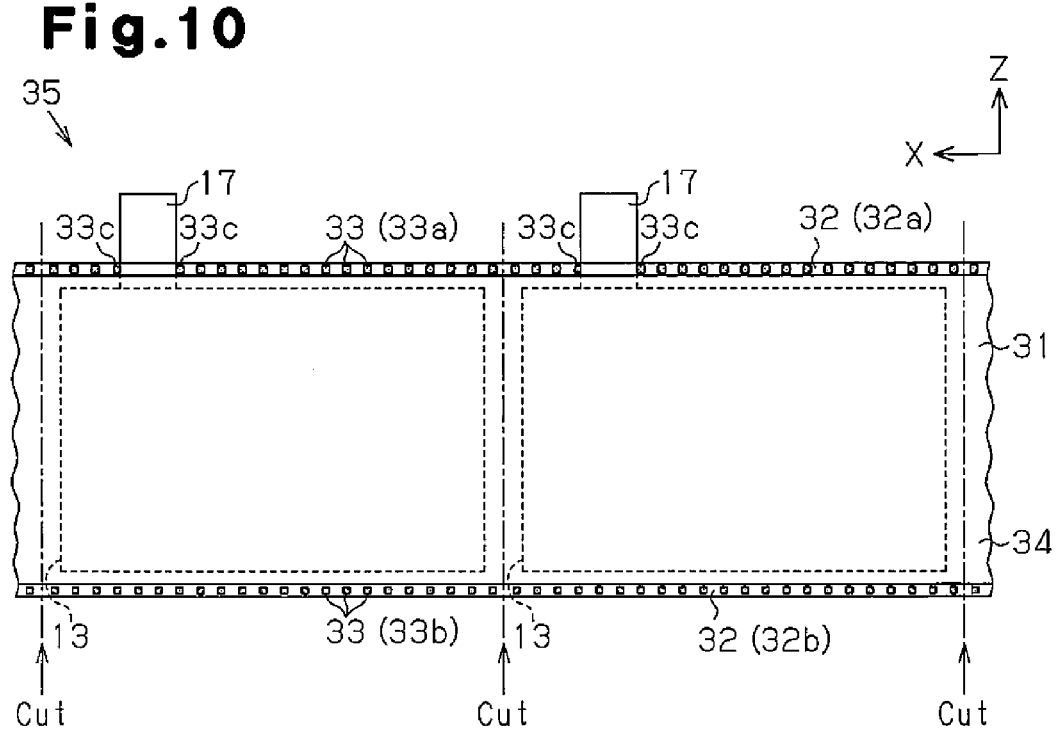
FIG. 10 is an explanatory diagram illustrating a state in which the welded separator sheet base materials are to be cut apart.

Subsequently, as illustrated in FIG. 10, the belt-like separator unit 35 is cut apart between each adjacent pair of the positive electrode sheets 13 to form a plurality of electrode-incorporating separators 10. The belt-like separator unit 35 may be cut apart by various methods, such as punching or cutting. In this manner, the multiple electrode-incorporating separators 10 are formed from the single belt-like separator unit 35.

Next, in a laminating step, the electrode-incorporating separators 10 and the negative electrode sheets 11 are laminated together alternately. After a necessary number of electrode-incorporating separators 10 and a necessary number of negative electrode sheets 11 are laminated together, the non-coated portions 17 of the positive electrode sheets 13 are bundled with one another and the non-coated portions 21 of the negative electrode sheets 11 are bundled with one another in correspondence with the polarities of the electrodes. Then, the lead 24 and the lead 25 are welded to the non-coated portions 17 and the non-coated portions 21, respectively, to assemble the electrode assembly 5. The electrode assembly 5 is then incorporated in the case body 4 and the opening 4a of the case body 4 is closed by the case lid 6. As a result, the secondary battery 2 is assembled.

As has been described, in the present embodiment, the non-coated portion 32a and the non-coated portion 32b, which are not coated with the ceramic, are arranged on the upper side 29a and the lower side 29b, respectively, of each of the two ceramic-coated separator sheets 29. The separator sheets 29 are then welded together at the non-coated portions 32a, 32b such that the separator body 12 is formed in a bag-like shape. As a result, using the separator sheets 29 each having ceramic-coated surfaces, durability of an electrode-incorporating separator against heat shrinkage is improved. Also, by a simple method such as welding, an electrode-incorporating separator having the firmly fixed separator sheets 29 is provided.

The present embodiment provides the following advantages.

(1) Since each separator sheet 29 is coated with the ceramic, durability of the electrode-incorporating separator 10 against heat shrinkage is improved when the electrode-incorporating separator 10 is in use. Also, since the non-coated portions 32a and the non-coated portions 32b, which are not coated with the ceramic, are arranged on the upper side 29a and the lower side 29b, respectively, of each separator sheet 29, two separator sheets 29 are welded together in a bag-like shape at the non-coated portions 32a, 32b. As a result, the separator sheets 29 having ceramic-coated surfaces are firmly joined to each other in a bag-like shape with the positive electrode sheet 13 incorporated between the separator sheets 29.

(2) By wrapping each positive electrode sheet 13 with two separator sheets 29 in advance, the electrode-incorporating separator 10 is formed as a component. The electrode assembly 5 is assembled by alternately laminating the electrode-incorporating separators 10 and the negative electrode sheets 11. This decreases the number of the laminating steps in assembly of the electrode assembly 5, thus shortening the takt time of manufacturing. As a result, productivity of the electrode assembly 5 and, consequently, productivity of the secondary battery 2 are improved.

(3) Out of positive and negative electrodes, the positive electrode (the positive electrode sheet 13) is incorporated in the electrode-incorporating separator 10. Generally, to facilitate ion exchange between the positive and negative electrodes, the electrode assembly 5 of this type must have a larger-sized negative electrode than a positive electrode. By incorporating the positive electrode sheet 13 in the electrode-incorporating separator 10 as in the case of the present embodiment, the outer dimensions of the electrode-incorporating separator 10 are equalized with the outer dimensions of the negative electrode sheet 11 such that the negative electrode becomes larger-sized than the positive electrode. Also, when the electrode-incorporating separators 10 and the negative electrode sheets 11 are alternately laminated together to assemble the electrode assembly 5, the electrode-incorporating separators 10 and the negative electrode sheets 11 are positioned easily. Further, the electrode-incorporating separators 10 and the negative electrode sheets 11, which are laminated together in the electrode assembly 5, become unlikely to be displaced from one another.

(4) The non-coated portions 32a and the non-coated portions 32b are arranged on the upper side 29a and the lower side 29b, respectively, of each separator sheet 29 coated with the ceramic. Accordingly, two elongated belt-like separator sheet base materials 34 each having surfaces coated except for an upper side and a lower side are prepared. A plurality of positive electrode sheets 13 is then arranged between the separator sheet base materials 34 and the separator sheet base materials 34 are welded together at the upper sides and the lower sides of the separator sheet base materials 34. The separator sheet base materials 34 are then cut apart between each adjacent pair of the positive electrode sheets 13. In this manner, the electrode-incorporating separator 10 is manufactured through the simple steps.

(5) The non-coated portion 32a and the non-coated portion 32b are formed along the upper side 29a and the lower side 29b, respectively, of each separator sheet 29 throughout the entire length of the separator sheet 29. This ensures a large joining surface of each separator sheet 29 such that the two separator sheets 29 are firmly attached and fixed to each other.

(6) When two separator sheets 29 are welded together at the non-coated portions 32a, 32b, the positioning weld portions 33c are formed to hold the base of the non-coated portion 17 of each positive electrode sheet 13 from opposite sides of the extending direction of the non-coated portion 32a. The non-coated portion 17 of the positive electrode sheet 13 is thus positioned in the left-right direction by the positioning weld portions 33c. This makes it unlikely that the positive electrode sheet 13 is displaced in the incorporating portion 30 in the left-right direction.

The present embodiment is not limited to the configuration shown above, but may be modified as shown below.

Figure 11:
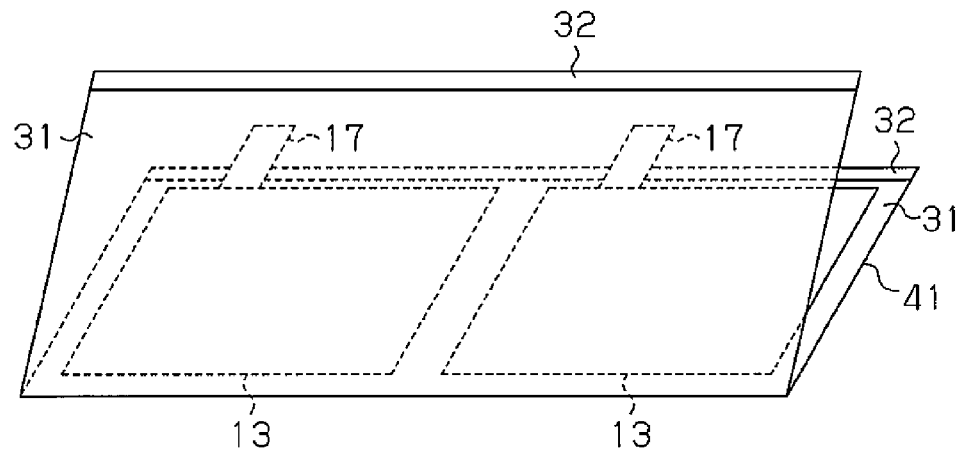
FIG. 11 is an explanatory diagram illustrating an example of manufacture of an electrode-incorporating separator according to another embodiment.

As illustrated in FIG. 11, a comparatively large-sized separator sheet 41 may be prepared. In this case, a plurality of positive electrode sheets 13 is arranged in the vicinity of one of opposite sides of the separator sheet 41. The separator sheet 41 is then bent at the midline of the separator sheet 41 to wrap the positive electrode sheets 13 from front sides and backsides of the positive electrode sheets 13. Subsequently, the separator sheet 41 is welded and cut apart to manufacture a plurality of electrode-incorporating separators. In this case, the electrode-incorporating separators 10 are manufactured simply by bending the single separator sheet 41.

The non-coated portions 32a, 32b do not necessarily have to be formed along at least one of the upper side 29a and the lower side 29b throughout the entire length of the upper or lower side 29a, 29b, but may be provided partially.

The non-coated portions 32a, 32b may be formed on the left and right sides, for example, of each separator sheet 29.

The size (the surface area) of each non-coated portion 32a, 32b may be changed as needed.

The upper non-coated portion 32a and the lower non-coated portion 32b may have different lengths.

Figure 12:
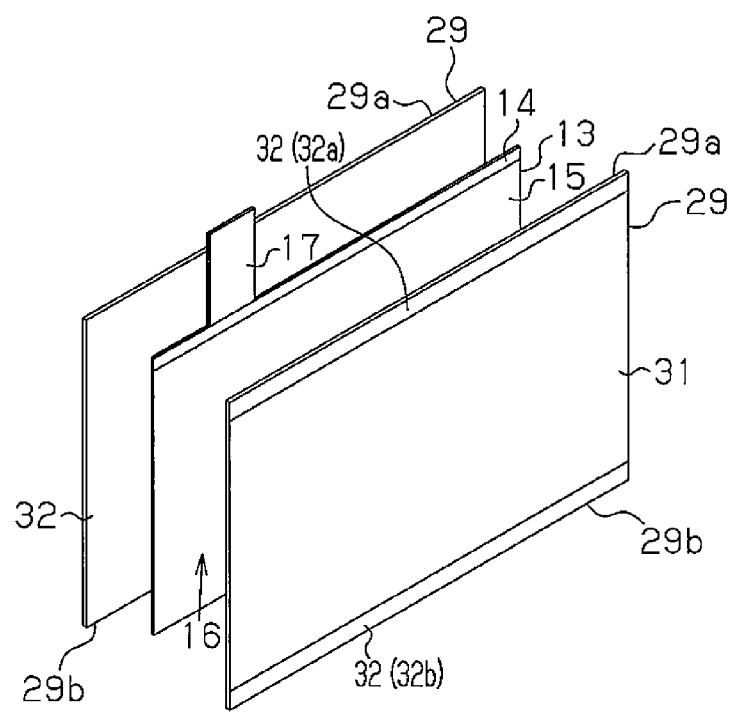
FIG. 12 is a perspective view showing an electrode-incorporating separator of a modification.

In each of the separator sheets 29, which are illustrated at the front position and the rear position in FIG. 12, the entire surface facing the positive electrode sheet 13 (the electrode) may configure the non-coated portion 32, which is not coated with the ceramic. In this case, in the separator sheet 29 shown at the front position in FIG. 12, at least a portion of the surface opposite to the surface facing the positive electrode sheet 13 (the electrode), which is the front surface, is coated with the ceramic. Also, at least a portion of the rear surface of the separator sheet 29 shown at the rear position in FIG. 12 may be coated with the ceramic. Further, the front surface of the separator sheet 29 illustrated at the front position in FIG. 12 and the rear surface of the separator sheet 29 shown at the rear position in FIG. 12 may be coated with the ceramic.

In each separator sheet 29, at least only the surface (the sheet surface) on which the electrode is arranged may be coated with the ceramic.

When the positive electrode sheets 13 are arranged on the separator sheet base material 34, each positive electrode sheet 13 may be oriented in the direction rotated counter-clockwise at approximately 90 degrees as viewed in FIG. 9, for example.

As ceramic, at least one may be selected and used from the group consisting of alumina, titania, zirconia, aluminum nitride, magnesia, silicon oxide, silicon carbide, and silicon nitride.

The manufacture of the electrode-incorporating separators 10 is not restricted to arranging the positive electrode sheets 13 on the single elongated belt-like separator sheet base material 34 and cutting the separator sheet base material 34 apart in correspondence with the respective positive electrode sheets 13. For example, the electrode-incorporating separator sheets 10 may be manufactured by arranging a positive electrode sheet 13 between two separator sheets 29 that have been cut in the final size in advance and welding peripheral portions of the separator sheets 29 to each other.

The separator sheets 29 may be joined to each other not through welding but through any other suitable method such as adhesion or taping.

The positive terminal 7 and the negative terminal 8 do not necessarily have to be arranged on the same side of the electrode pair 28, but may be provided at different sides of the electrode pair 28.

The collector portions 22, 23 do not necessarily have to be arranged on the top surface of the electrode pair 28, but may be provided on a side surface or the bottom surface of the electrode pair 28.

The number of the positive collector portion 22 is not restricted to one. For example, a plurality of positive collector portions 22 may be provided and electrically connected using a single lead or a plurality of leads. The same applies to the negative collector portions 23.

The positive electrode sheets 13 and the negative electrode sheets 11 do not necessarily have to be the thin sheet-like members but may be, for example, plate-like members that each have a predetermined thickness.

The material of each positive electrode sheet 13, the material of each negative electrode sheet 11, and the material of each separator sheet 29 may be changed as needed.

The configuration of each positive terminal 7, the configuration of each negative terminal 8, and the configuration of each collector portion 22, 23 are not restricted to the configurations described above and may be modified to other configurations.

The position of the opening 4a of the case body 4 is not restricted to the position in the top surface of the case body 4 and may be a position in any suitable portion such as a side surface of the case body 4.

The configuration of the electrode assembly 5 is not restricted to the laminated configuration and may be a rolled configuration formed by rolling a sheet-like electrode pair multiple times to provide positive electrode layers and negative electrode layers.

The electrical storage device is not restricted to a secondary battery and may be, for example, an electrical storage device that is recharged and discharged using an electric double layer capacitor.

The electrode in each electrode-incorporating separator 10 is not restricted to a positive electrode, but a negative electrode may be incorporated in the electrode-incorporating separator 10.

The positive lead 24 and the negative lead 25 may be welded by various methods including spot welding, butt welding, and projection welding. Also, welding is not restricted to resistance welding but any other suitable welding method may be employed.

Each electrode-incorporating separator 10 does not necessarily have to have a bag-like shape but may have any other suitable shape such as a tubular shape.

The shape of each separator sheet 29 is not restricted to the rectangular shape but may be changed to any other suitable shape as needed.

The electrode assembly 5 or the secondary battery 2 does not necessarily have to be mounted in the vehicle 1 but may be arranged in any other suitable apparatuses and devices.

DESCRIPTION OF THE REFERENCE NUMERALS

1 . . . vehicle, 2 . . . secondary battery (electrical storage device), 5 . . . electrode assembly, 10 . . . electrode-incorporating separator, 11 . . . negative electrode sheet (electrode), 13 . . . positive electrode sheet (electrode), 17 . . . non-coated portion (tab), 29 . . . separator sheet, 29a . . . upper side, 29b . . . lower side, 30 . . . incorporating portion, 31 . . . coated portion, 32 (32a, 32b) . . . non-coated portion, 33 (33a, 33b, 33c) . . . weld portion

The invention claimed is:

1. An electrode-incorporating separator having two separator sheets facing each other and an electrode held between the two separator sheets, wherein
    facing surfaces of the two separator sheets each include a coated portion coated with a ceramic and a non-coated portion that is not coated with the ceramic and is arranged in at least a portion of a range corresponding to a periphery of the electrode,
    the two separator sheets are joined to each other at the non-coated portions,
    each of the separator sheets has a rectangular shape,
    the electrode has a tab that protrudes outward from a periphery of the electrode,
    the non-coated portion is formed along one side of the separator sheet and the other side of the separator sheet, the one side of the separator sheet corresponds to a side from which the tab of the electrode protrudes, and the other side of the separator sheet faces the one side of the separator sheet, and
    a joint portion at which the two separator sheets are joined is located at opposite sides of the tab.

2. The electrode-incorporating separator according to claim 1, wherein, in at least one of the two separator sheets, at least a portion of a surface opposite to the surface facing the electrode is coated with the ceramic.

3. The electrode-incorporating separator according to claim 1, wherein each non-coated portion is formed along a side of the associated separator sheet along the entire length of the side.

4. The electrode-incorporating separator according to claim 1, wherein
    the tab extends on a plane coinciding with a surface of the electrode, and
    the tab is held between the non-coated portions of the two separator sheets.

5. The electrode-incorporating separator according to claim 1, wherein the electrode is a positive electrode.

6. An electrical storage device having the electrode-incorporating separator according to claim 1.

7. The electrical storage device according to claim 6, wherein the electrical storage device is a secondary battery.

8. A vehicle wherein the secondary battery according to claim 7 is mounted thereon.

* * * * *